(12) United States Patent
Moser et al.

(10) Patent No.: US 7,555,449 B2
(45) Date of Patent: Jun. 30, 2009

(54) SYSTEM AND METHOD FOR UPDATING STOP LOSS ORDERS

(75) Inventors: Martin Moser, Speyer (DE); Martin Helm, Bad Schönborn (DE); Uwe Riss, Heidelberg (DE); Bernd Maier, Schwetzingen (DE); Ali Becerikogullari, Schlüchtern (DE); Uwe Bischoff, Köln (DE)

(73) Assignee: SAP AG, Walldorf (DE)

( * ) Notice: Subject to any disclaimer, the term of this patent is extended or adjusted under 35 U.S.C. 154(b) by 808 days.

(21) Appl. No.: 10/869,899

(22) Filed: Jun. 18, 2004

(65) Prior Publication Data

US 2005/0283423 A1 Dec. 22, 2005

(51) Int. Cl.
*G06Q 40/00* (2006.01)
(52) U.S. Cl. ....................................................... 705/35
(58) Field of Classification Search ................... 705/35, 705/36 R, 37; 708/105, 110, 131, 132, 134; 434/107, 109, 433
See application file for complete search history.

(56) References Cited

U.S. PATENT DOCUMENTS 7,065,475 B1 * 6/2006 Brundobler .................... 703/2

7,213,002 B2 * 5/2007 Cohen .......................... 705/38
2002/0103742 A1 * 8/2002 Billings et al. ................. 705/37

OTHER PUBLICATIONS

United States Securities and Exchange Commission definition of Stop order available from http://www.sec.gov/answers/stopord.htm, published May 31, 2002, accessed on Feb. 7, 2008.*

* cited by examiner

*Primary Examiner*—Mary Cheung
*Assistant Examiner*—Brian Fertig
(74) *Attorney, Agent, or Firm*—Kenyon & Kenyon LLP

(57) ABSTRACT

A method and system are disclosed for automatically updating individual conditions associated with a pending conditional financial transaction. As the price of a financial instrument varies, a pending conditional financial transaction may be issued to cause the financial instrument to be bought or sold whenever its price satisfies certain specified conditions. In the field of common stock transactions, the disclosed method automatically updates a pending conditional sell order, called a stop loss order, upon the occurrence of several conditions, such as when the current stop loss order has expired, when the current price of one share of the stock has risen a predetermined percentage above the current stop loss value, or when the total value of all of the shares of the stock has increased beyond a predetermined percentage limit. When a stop loss order is updated, a new stop loss value is calculated based upon the current price and a percentage leeway in the price. The new stop loss order is then transmitted to an appropriate financial institution.

18 Claims, 5 Drawing Sheets

500

SYSTEM AND METHOD FOR UPDATING STOP LOSS ORDERS

TECHNICAL FIELD

This invention relates generally to techniques for automatically issuing orders to buy and sell publicly traded stocks. More particularly, the invention relates to methods and systems for electronically updating a stop loss order associated with a number of previously purchased shares of publicly traded stock. Additionally, the invention incorporates methods and systems for electronically updating individual conditions associated with a pending conditional financial transaction.

BACKGROUND OF THE INVENTION

In the field of financial investing, a stop loss order is a conditional order placed with a broker to buy or sell a particular financial instrument once the instrument reaches a certain price. A stop loss order is designed to limit an investor's loss on a security position. For example, if an investor purchases several common shares of a given corporate stock at $50 per share, and immediately issues a stop loss order for $45 (10% below the purchase price), then if the price of the stock subsequently falls below $45 per share, the shares will be automatically sold by the broker at the prevailing market price.

The advantage of a stop loss order is that the investor does not have to monitor on a daily basis how a given stock is performing. The disadvantage is that the stop loss order could be activated by a short-term fluctuation in a stock's price. Thus, one of the important factors to consider when placing a stop loss order is picking a stop-loss percentage that will allow a stock to fluctuate day-to-day while preventing as much downside risk as possible. For example, setting a 5% stop loss order on a stock that has a history of fluctuating 10% or more per week will most likely result in the stock being sold at a loss. Additionally, once a financial instrument reaches the stop price, a stop loss order becomes a market sell order, and the price at which the financial instrument is sold may be significantly different from the stop price. This is especially true in a fast-moving stock market where stock prices can change rapidly.

Stop loss orders are traditionally viewed as a way to prevent losses. Another use of this tool, however, is to lock-in profits, in which case it is sometimes referred to as a "trailing stop." Here, the stop loss order is set at a percentage level below not the price at which the financial instrument was originally purchased, but the current market price. If the price of a stock goes up, the value of the stock to an investor is an unrealized gain, because the gain is not realized until the stock is sold and its value is converted into actual currency. Using a trailing stop allows the investor to let potential profits increase, while at the same time guaranteeing at least some realized capital gain. To use the same example from above, assume an investor purchases several common shares of a given corporate stock at $50 per share. At a later point, after the price of the stock increases to $80 per share, assume the investor issues a stop loss order at 10% below the current price. The stop loss price is then set at $72 per share. If the price of the stock then falls below $72 per share, the stop loss order would automatically trigger a sale of the stock, thus preserving at least a portion of the investor's capital gains.

A stop loss order is a simple and effective tool for investors. However, it has limitations. First, a stop loss order is static. That is, it does not automatically advance with rising stock rates. Thus, if a financial instrument doubles in price, an associated stop loss order will remain fixed. An investor must take specific actions to increase or modify the stop loss order to account for a price increase. Another limitation is duration. A stop loss order is usually valid for a fixed period of time, usually one month. When the period elapses, the stop loss order expires and thus becomes ineffective at preventing future losses in the event a stock price subsequently drops. Accordingly, there is a need in the art for a system and method to automatically update stop loss orders under certain predefined conditions. Additionally, there is a need in the art for a system and method to automatically update individual conditions associated with pending conditional financial transactions.

DETAILED DESCRIPTION

Figure 1:
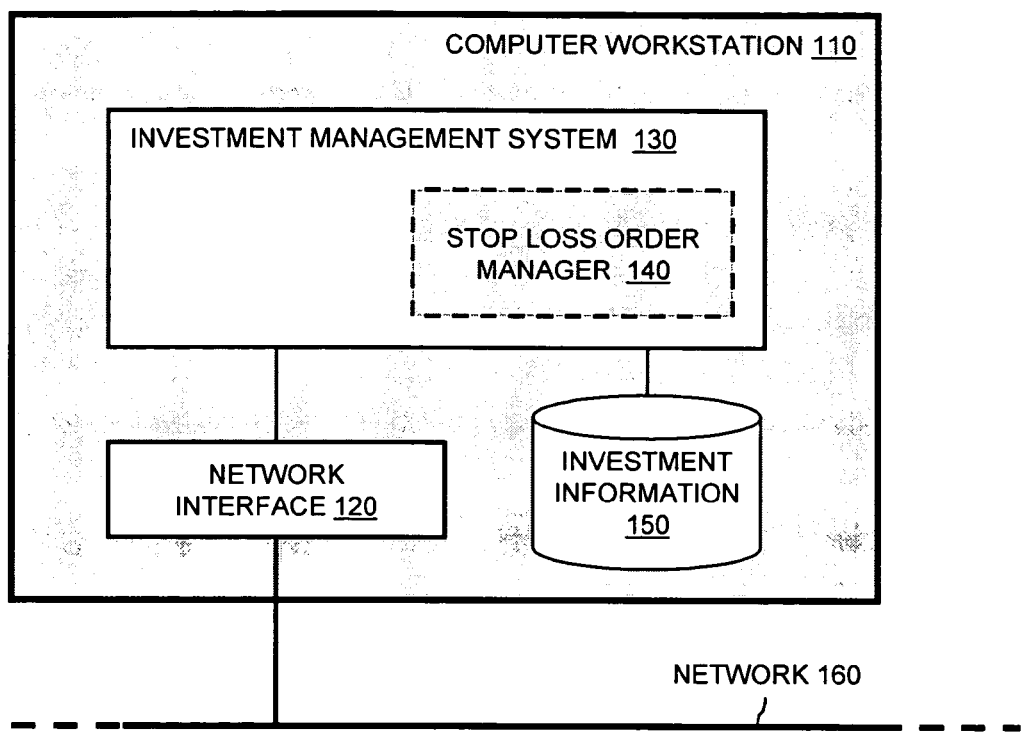
FIG. 1 is a high-level block diagram of a computer system incorporating a system and method for updating individual conditions associated with a pending conditional financial transaction, in accordance with an embodiment of the present invention.

Embodiments of the present invention are directed to a system and method for automatically updating individual conditions associated with a pending conditional financial transaction. As the price of a financial instrument varies, a pending conditional financial transaction may be issued to cause the financial instrument to be bought or sold whenever its price satisfies certain specified conditions. In the field of common stock transactions, the disclosed method automatically updates a pending conditional sell order, called a stop loss order, upon the occurrence of several conditions, such as when the current stop loss order has expired, when the current price of one share of the stock has risen a predetermined percentage above the current stop loss value, or when the total value of all of the shares of the stock has increased beyond a predetermined percentage limit. When a stop loss order is updated, a new stop loss value is calculated based upon the current price and a percentage leeway in the price. The new stop loss order is then transmitted to an appropriate financial institution.

Embodiments of the present invention will be described with reference to the accompanying drawings, wherein like parts are designated by like reference numerals throughout, and wherein the leftmost digit of each reference number refers to the drawing number of the figure in which the referenced part first appears.

FIG. 1 is a high-level block diagram of a computer system incorporating a system and method for updating individual conditions associated with a pending conditional financial transaction, in accordance with an embodiment of the present invention. As shown in FIG. 1, computer workstation 110 may be a computer having a processor and a memory configured to enable an investment management system 130 to monitor pending conditional financial transactions. To accomplish these functions, computer workstation 110 may include investment management system 130, which receives current price information for various financial instruments, reviews and analyzes a user's investment information 150, and issues updates to the user's pending conditional financial transactions depending on parameters supplied by the user and stored among the investment information 150. According to an embodiment, investment management system 130 may further include stop loss order manager 140 that supervises and controls operations pertaining to pending stop loss orders. Stop loss order manager 140 may communicate with network interface 120 to determine the current prices of stocks corresponding to pending stop loss orders maintained in the user's investment information 150. Alternatively, stop loss order manager 140 may receive stock prices directly via other input means such as keyboard input. Stop loss order manger 140 may also communicate with network interface 120 to transmit updated stop loss orders to the user's financial institution.

Continuing to refer to FIG. 1, network interface 120 may include specific methods and objects that enforce required financial interface protocols. For example, network interface 120 may use the HBCI interface (Home Banking Computer Interface) to communicate with the financial institutions. Other financial interfaces known in the art include FinTS (Financial Transaction Services; most recent version of HBCI) and OFX (Open Financial Exchange).

Additionally, stop loss order manager 140 may interact with investment information 150 to retrieve, analyze and update a user's investment and financial data. Thus, investment information 150 may contain files and databases associated with financial securities maintained by the user. Examples of such files and databases include financial institution information, stock rate provider data, securities account data and information associated with specific investments. Investment information 150 may be organized as traditional databases, or may be implemented using flat text files, or any combination of databases and files.

Figure 2:
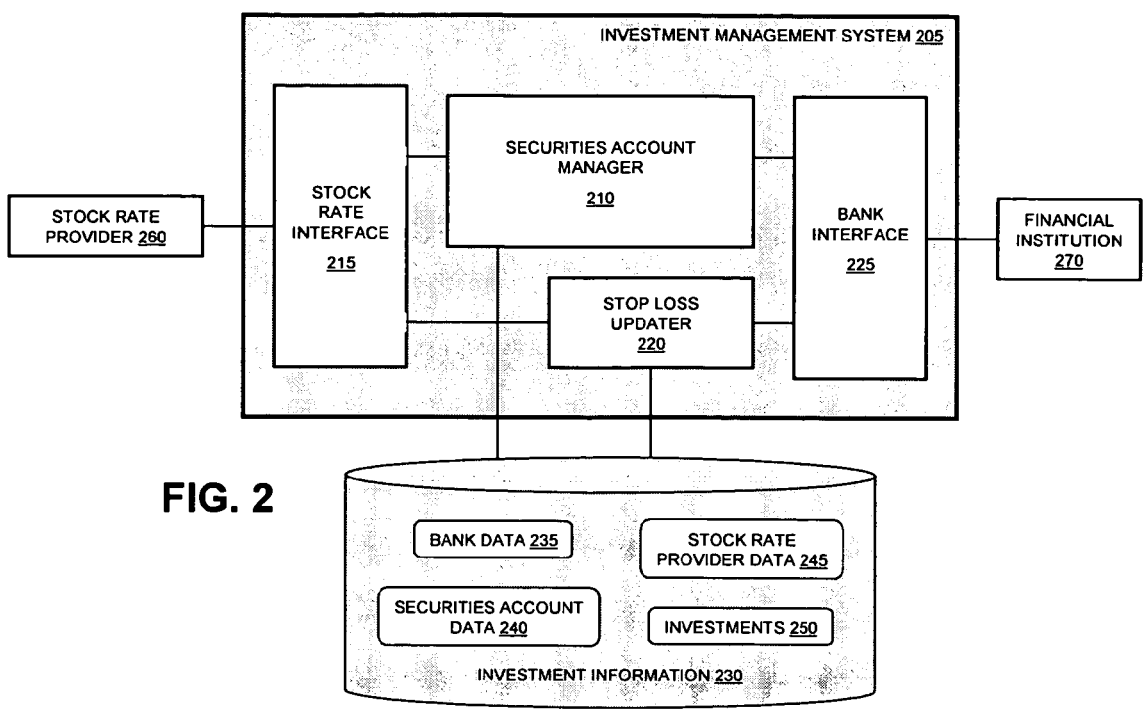
FIG. 2 is a high-level block diagram of a software architecture incorporating a system and method for updating a stop loss order for shares of publicly traded stock, in accordance with an embodiment of the present invention.

FIG. 2 is a high-level block diagram of a software architecture incorporating a system and method for updating a stop loss order for shares of publicly traded stock, in accordance with an embodiment of the present invention. Investment management system 205 (see also item 130, FIG. 1) is a software application that, according to an embodiment, consists of securities account manager 210, stock rate interface 215, stop loss updater 220, and bank interface 225. Securities account manager 210 permits the user to edit his investment information 230, which includes bank data 235, securities account data 240, stock rate provider data 245, and investments 250. Stock rate interface 215 reads current stock rates from external stock rate provider 260, an example of which is "www.yahoo.com." Stop loss updater 220 analyzes stock rates received from stock rate interface 215, matches them to the various stocks maintained in securities account data 240, and generates stop loss updates as required. Bank interface 225 communicates with the financial institution 270 that holds the actual securities accounts on behalf of the user. Bank interface 225 acts as a conduit through which stop loss updater 220 transmits the updated stop loss data to the appropriate financial institution 270.

Figure 3:
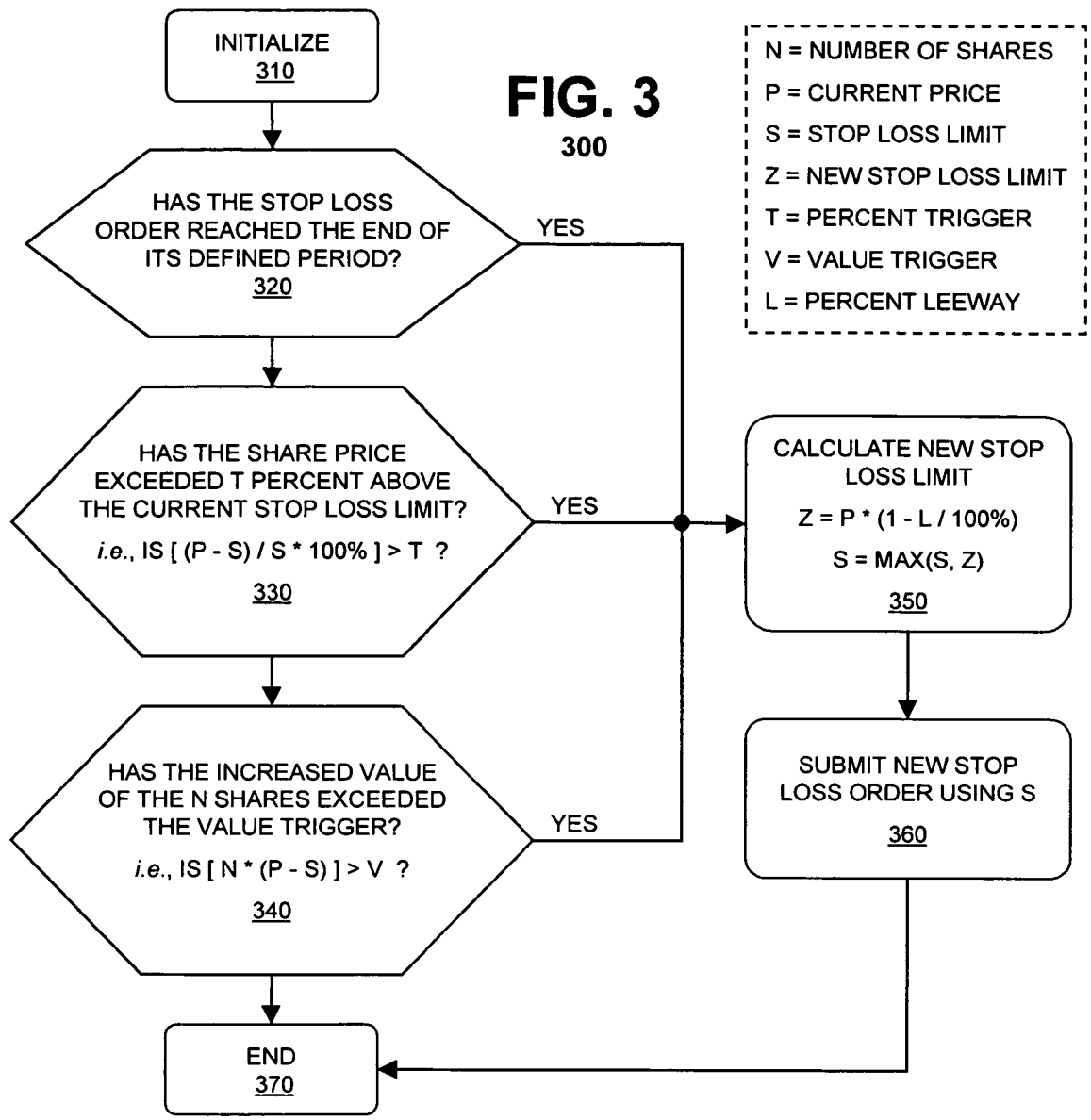
FIG. 3 is a flow chart illustrating a method for updating a stop loss order for shares of publicly traded stock, according to an embodiment of the present invention.

FIG. 3 is a flow chart illustrating a method for updating a stop loss order for shares of publicly traded stock, according to an embodiment of the present invention. The method 300 may begin by initializing local parameters and accessing stored information pertaining to a user's investments (310). For each stop loss order, method 300 may maintain the following parameters, as illustrated in FIG. 3.

N=the number of shares of stock affected by the pending stop loss order.

P=the current price of one share of the stock.

S=the current stop loss limit, which is the value below which the stock will be automatically sold.

Z=a newly-calculated stop loss limit.

T=a percent value used to trigger the generation of a new stop loss order when the price of one share of the stock exceeds the given percentage above the current stop loss limit (that is, when $\{(P-S)/S*100\%\}>T$).

V=a net value increase trigger used to determine when the net increased value of all of the shares of stock has increased enough to warrant issuing a new stop loss order (that is when $\{N*(P-S)\}>V$).

L=the percentage leeway that will be allowed in the price of the stock before the stop loss order will activate to sell the stock. The percentage leeway accounts for the anticipated volatility of the price of the stock.

Continuing to refer to FIG. 3, after gathering the information associated with a pending stop loss order as well as the current price for the corresponding stock, method 300 performs a series of tests to determine whether the pending stop loss order should be updated. The first of these tests determines whether the stop loss order has reached the end of its defined period (320). That is, whether the stop loss order has expired (320). This involves a simple date comparison. The second test determines whether the price of one share of the corresponding stock has exceeded T percent above the current stop loss limit (330)—that is, whether $\{(P-S)/S*100\%\}>T$ (330). The final test determines whether the increased value of all of the shares together has exceeded the net value increase trigger V—that is, whether $\{N*(P-S)\}>V$ (340).

If any of these tests are satisfied, a new stop loss limit is calculated, based on the current price of the stock and the predetermined value of L, which is the percentage leeway that will be allowed in the price of the stock before the stop loss order will activate to sell it (350). A two-stage calculation is performed. First, the new stop loss limit, Z, is set to the value $P*(1-L/100\%)$. Then, the current stop loss limit, S, is assigned the maximum of the old (or first-determined) value of S and the new value of Z (350). Finally, a new stop loss order is issued to the appropriate financial institution, specifying the newly assigned current stop loss limit value of S (360). Method 300 then saves the newly assigned current stop loss limit value S and terminates (370).

Figure 4:
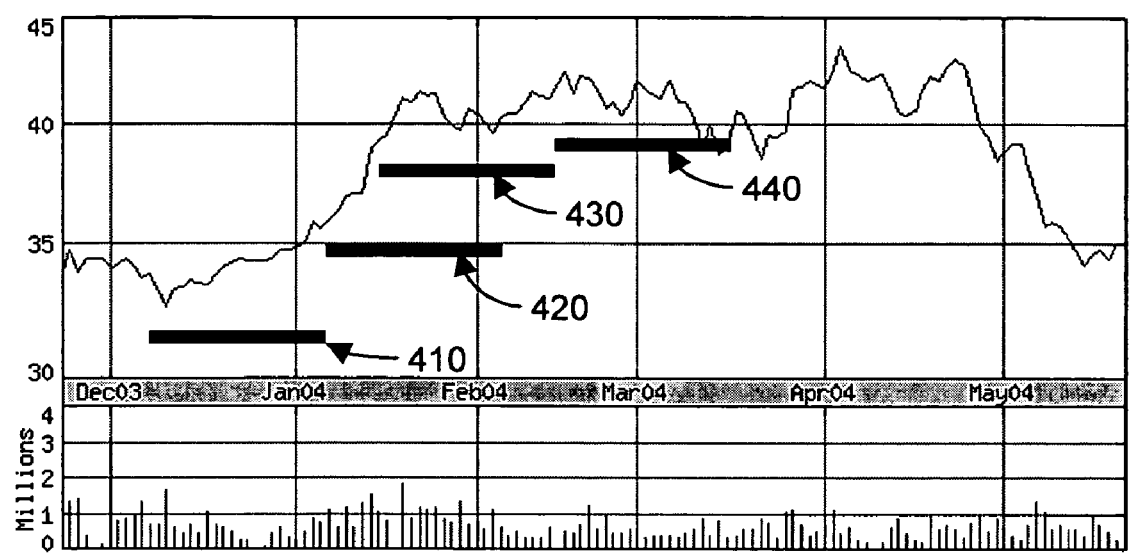
FIG. 4 is a graph illustrating the historical changes in the price of a publicly traded stock, along with examples of various stop loss orders issued according to an embodiment of the present invention.

FIG. 4 is an example of method 300 in action. In FIG. 4, a chart is shown tracing the price history of a given stock from approximately Dec. 2003 through May 2004. Beginning in Dec. 2003, the price of the stock was approximately $34 per share. Shortly afterwards, a stop loss order at approximately $32 was put into place (410). Then, the stock price began to climb. In the first week of Jan. 2004, method 300 was invoked to determine whether to issue a new stop loss order. Because the old stop order had expired, method 300 calculated a new stop loss value and issued a new stop loss order at approximately $35 (420). As the stock continued to climb, method 300 was repeated toward the second week of Jan 2004. Because the price of the stock had risen so quickly, method 300 determined that the share price had exceeded the percent trigger established by the investor, and a new stop loss order was issued at approximately $38 (430). With the stock price leveling off, method 300 was invoked in mid-Feb. as the old stop loss order expired (440). Finally, on approximately Mar. 10, 2004, the price of the stock fell to the stop loss value and the stock was sold automatically.

Several embodiments of the present invention are specifically illustrated and described herein. However, it will be appreciated that modifications and variations of the present invention are covered by the above teachings and within the purview of the appended claims without departing from the spirit and intended scope of the invention.

For example, the invention may be extended to other financial operations such as stop buy orders, direct buys, option contracts, and sales contracts. Further, other financial instruments, such as stock options or currencies can be purchased instead of stocks.

As another example, the invention may be adapted to implement a "virtual stop loss." Instead of relying on a financial institution to monitor the price of a financial instrument and trigger a market sell order, the present invention may be modified to send a direct sell order to the financial institution whenever the value of the financial instrument exceeds a predefined limit. Using this embodiment, the invention may also permit a stop loss order to be updated locally, and not require transmission of a new stop loss order to be sent to a financial institution.

Finally, rather than requiring a user to choose the value of L (the percentage leeway that will be allowed in the price of a stock before a stop loss order will activate to sell the stock), an embodiment of the present invention can provide or propose one. For example, the user may permit the invention to set L=3%*(V−1.0), where V is the volatility based on the beta coefficient of a stock. When L is being set algorithmically under this or similar conditions, the present invention may also permit the user to provide upper and lower limits for L, in order to confine the range of L's values.

Figure 5:
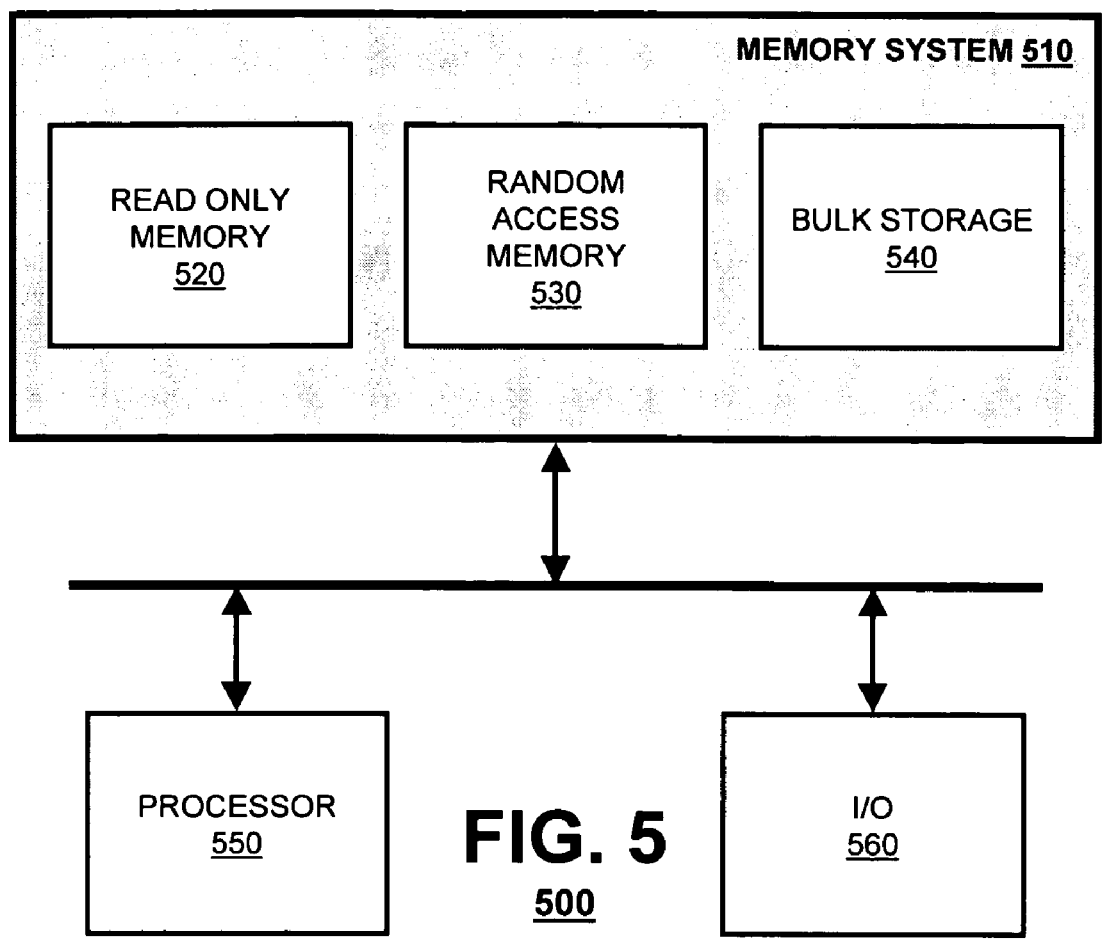
FIG. 5 is a simplified block diagram of a computer system useful with the present invention.

The functionality of the foregoing embodiments may be provided on various computer platforms executing program instructions. One such platform 500 is illustrated in the simplified block diagram of FIG. 5. There, the platform 500 is shown as being populated by a processor 550, a memory system 510 and an input/output (I/O) unit 560. The processor 550 may be any of a plurality of conventional processing systems, including microprocessors, digital signal processors and field programmable logic arrays. In some applications, it may be advantageous to provide multiple processors (not shown) in the platform 500. The processor(s) 550 execute program instructions stored in the memory system 510. The memory system 510 may include any combination of conventional memory circuits, including electrical, magnetic or optical memory systems. As shown in FIG. 5, the memory system may include read only memories 520, random access memories 530 and bulk storage 540. The memory system not only stores the program instructions representing the various methods described herein but also may store the data items on which these methods operate. The I/O unit 560 would permit communication with external devices (not shown).

What is claimed is:

1. A method for updating a stop loss order for shares of a publicly traded stock, the method executed by a computer processor comprising:

accessing by the processor via a network communication path, a data record containing investment information pertaining to the stop loss order, said investment information including a current stop loss value for the shares of the stock and a percentage leeway of the value of the stock;

receiving, by the processor, a current price of one share of the stock, determining, by the processor, whether the current price of one share of the stock has risen a predetermined percentage trigger above the current stop loss value;

calculating, by the processor, a new stop loss value based on the current price and the percentage leeway, wherein the percentage leeway is based on a user-selectable percentage multiplied by the quantity (v−1.0), where v corresponds to a percentage volatility of the stock, said volatility based on a beta coefficient of the stock; and issuing, by the processor via a network communication path, to a financial institution an update to the stop loss order for the shares, said update including the new stop loss value.

2. The method of claim 1, wherein the determining performed by the processor is based on whether the stop loss order has expired.

3. The method of claim 1, wherein the investment information further includes a predetermined value trigger corresponding to a predetermined net increase in the value of the n shares of the stock over the value of an n shares of the stock at the current stop loss value.

4. The method of claim 3, wherein the determining is based on whether the difference in value of the n shares of the stock at the current price and the value of the n shares of the stock at the current stop loss value has exceeded the predetermined value trigger.

5. The method of claim 1, further comprising:
storing the new stop loss value in the data record.

6. The method of claim 1, wherein the current price is retrieved over the Internet from a stock rate provider.

7. The method of claim 1, wherein the new stop loss value is set to equal the current price multiplied by 100% minus the percentage leeway.

8. The method of claim 7, wherein the percentage leeway is predetermined by an owner of the stock and stored along with the investment information pertaining to the stop loss order.

9. The method of claim 7, wherein the new stop loss value is further constrained to be greater or equal to a minimum stop loss value.

10. A machine-readable medium having stored thereon a plurality of instructions when executed by a processor implement a method for updating a stop loss order for n shares of a publicly traded stock, the method comprising:

accessing a data record containing investment information pertaining to the stop loss order, said investment information including a current stop loss value for the n shares and a percentage leeway of the value of the stock;

retrieving a current price of one share of the stock;

determining whether the current price of one share of the stock has risen a predetermined percentage trigger above the current stop loss value;

calculating a new stop loss value based on the current price and the percentage leeway, wherein the percentage leeway is based on a user-selectable percentage multiplied by the quantity (v−1.0), where v corresponds to a percentage volatility of the stock, said volatility based on a beta coefficient of the stock; and issuing to a financial institution over the network an update to the stop loss order for the n shares, said update including the new stop loss value.

11. The machine-readable medium of claim 10, wherein the new stop loss value is further constrained to be greater or equal to the current stop loss value.

12. The machine-readable medium of claim 10, wherein the instructions to determine electronically whether the stop loss order should be updated include further instructions to establish whether the stop loss order has expired.

13. The machine-readable medium of claim 10, wherein the instructions to determine electronically whether the stop loss order should be updated include further instructions to establish whether the current price of one share of the stock has risen a predetermined percentage trigger above the current stop loss value.

14. The machine-readable medium of claim 10, wherein the instructions to determine electronically whether the stop loss order should be updated include further instructions to establish whether the difference in value of the n shares of the stock at the current price and the value of the n shares of the stock at the current stop loss value has exceeded the predetermined value trigger.

15. A computer system, including:
  a processor coupled to a network;
  an investment information storage repository coupled to the processor;
  a memory coupled to the processor, the memory containing a plurality of instructions to implement a method for updating a stop loss order for n shares of a publicly traded stock, the method comprising:
    accessing investment information pertaining to the stop loss order, said investment information including a current stop loss value for the n shares of stock and a percentage leeway of the value of the stock;
    retrieving over a network a current price of one share of the stock;
    determining electronically whether the current price of one share of the stock has risen a predetermined percentage trigger above the current stop loss value;
    calculating electronically a new stop loss value based on the current price and on the percentage leeway, wherein the percentage leeway is based on a user-selectable percentage multiplied by the quantity (v−1.0), where v corresponds to a percentage volatility of the stock, said volatility based on a beta coefficient of the stock;
    issuing to a financial institution over the network an update to the stop loss order for the n shares, said update including the new stop loss value; and
    storing the new stop loss value among the investment information pertaining to the stop loss order.

16. A method for updating a pending conditional transaction for a plurality of financial assets, the method executed by a computer processor comprising:
  accessing by the processor via a network communication path, investment information pertaining to the pending conditional transaction, said investment information including a current value condition for the financial assets and a percentage leeway of the value of the financial assets;
  receiving, by the processor, over a network a current price of one of the financial assets;
  determining, by the processor, electronically whether the current price of one of the financial assets has risen a predetermined percentage trigger above the current value condition, wherein the percentage trigger is based on a user-selectable percentage multiplied by a corresponding to a percentage volatility of the stock, said volatility based on a beta coefficient of the financial assets;
  calculating electronically a new value condition based on the current price and on the percentage leeway, wherein the percentage leeway is based on a user-selectable percentage multiplied by the quantity (v−1.0), where v corresponds to a percentage volatility of the financial assets, said volatility based on a beta coefficient of the financial assets; and
  issuing, by the processor via a network communication path, to a financial institution over the network an update to the value condition for the plurality of financial assets, said update including the new value condition.

17. The method of claim 16, wherein the financial assets are publicly traded stocks and the value condition is a stop loss order.

18. The method of claim 16, wherein the financial assets are publicly traded stocks and the value condition is a stop buy order.

* * * * *